F. P. DUNN.
WEIGHING SCALE.
APPLICATION FILED DEC. 14, 1914.
1,339,440.
Patented May 11, 1920.
2 SHEETS—SHEET 2.
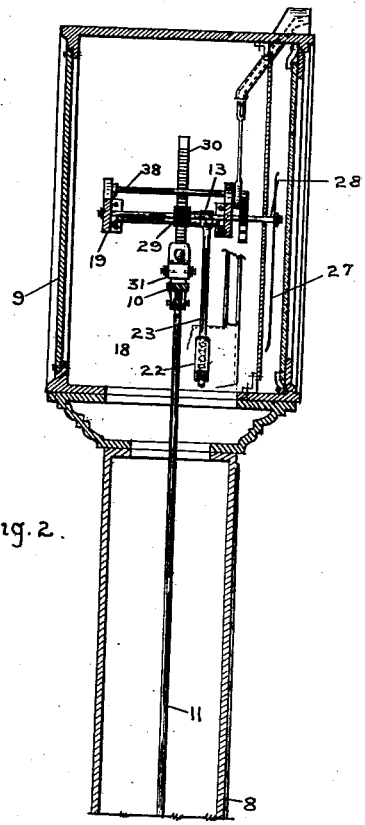
Fig. 2.
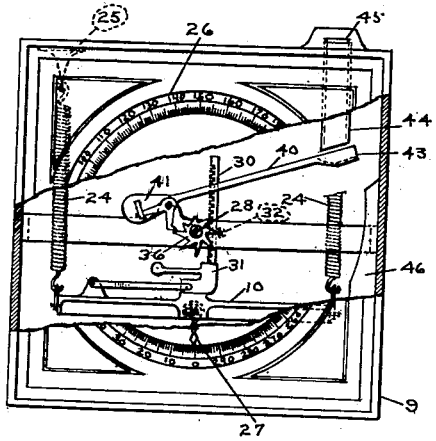
Fig. 4.
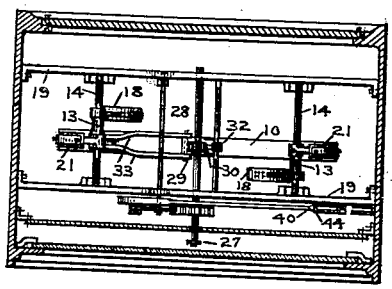
Fig. 3.
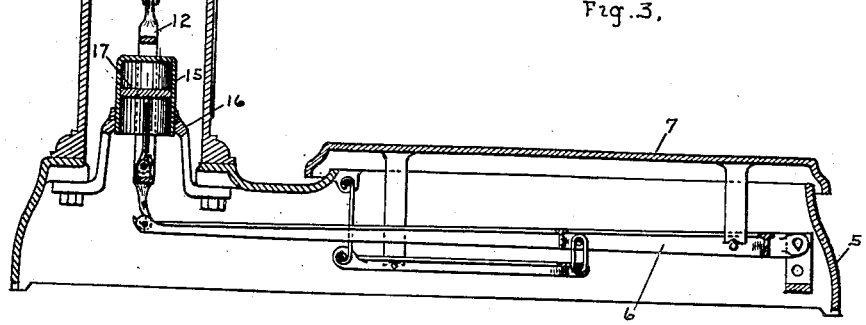
WITNESSES
Frank P. Dunn,
INVENTOR.
by George R. Frye,
ATTORNEY.

UNITED STATES PATENT OFFICE.

FRANK P. DUNN, OF ANDERSON, INDIANA, ASSIGNOR TO TOLEDO SCALE COMPANY, OF TOLEDO, OHIO, A CORPORATION OF NEW JERSEY.

WEIGHING-SCALE.

1,339,440.  Specification of Letters Patent.  Patented May 11, 1920.

Application filed December 14, 1914. Serial No. 877,105.

*To all whom it may concern:*

Be it known that I, FRANK P. DUNN, a citizen of the United States, residing at Anderson, in the county of Madison and State of Indiana, have invented certain new and useful Improvements in Weighing-Scales, of which the following is a specification.

This invention relates to weighing scales, and more particularly to scales in which the indicating means is normally held in locked or inoperative position, and is operable only upon the performance of some act, such as the insertion of a coin or check.

The primary object of this invention is to provide a simple, positively-acting scale particularly adapted for the weighing of persons, in which the load-offsetting mechanism may be of the pendulum type.

Another object of this invention is the provision of a coin-controlled scale wherein the mechanism for releasing the indicating means is simple, durable and efficient.

A further object is to improve the indicating mechanism of scales of this type, and so connect the indicating mechanism with the weighing mechanism that the indicating means will be immediately and positively actuated when released from its normal locked position.

A further object is to simplify the structure of scales of this type, and provide an inexpensive scale composed of parts not liable to become deranged, and so constructed that none of said parts is subjected to excessive wear or strain.

While this invention has been made especially for the purpose of providing a coin-controlled weighing scale, certain features of the invention will be found useful and may be employed in other types of weighing scales and in machines other than weighing scales. It is to be understood, therefore, that my invention is capable of various applications, and that many variations, modifications and changes may be made therein without departing from the spirit of the invention or the scope of the subjoined claims.

With the above and other objects in view which will readily appear from the following description, my invention consists of the novel construction, combination and arrangement of parts to be hereinafter more fully described, illustrated in the accompanying drawings, and particularly pointed out in the subjoined claims.

Reference is had to the accompanying drawings illustrating preferred forms of my invention, and wherein similar reference numerals designate similar parts throughout the several views.

In the drawings:—

Fig. 2 is a vertical section taken substantially on the line 2—2 of Fig. 1.

Fig. 3 is a horizontal section taken substantially on the line 3—3 of Fig. 1.

Fig. 4 is a front elevation of the upper portion of another embodiment of my invention, parts being broken away to disclose the interior construction.

Fig. 5 is an enlarged detail view of the star-wheel and trip-lever hereinafter described.

Figure 1:
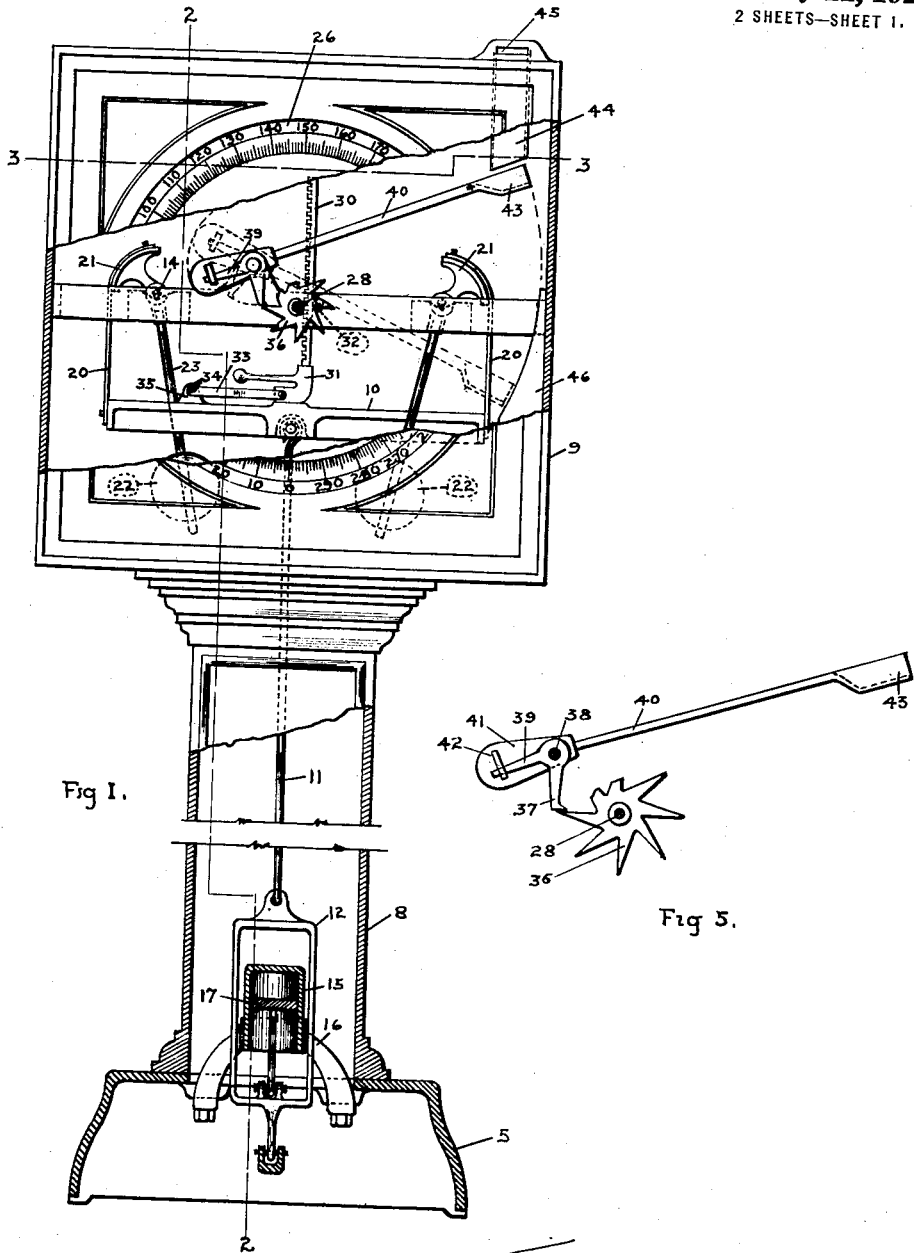
Figure 1 is a front elevation partly in section of a scale embodying my invention, and having portions broken away to disclose the interior construction.

Referring to the drawings, 5 designates the base inclosing the platform lever 6, which may be of any desired construction, a four-point leverage system being preferred, as this has been found beneficial in practice, and adequately supports the platform 7. A hollow column 8 extends upwardly from the rear of the base 5, and carries a housing 9 at its upper extremity, the housing being securely mounted and adapted to contain the several sets of mechanisms hereinafter described.

The weighing mechanism of the scale includes an equalizing bar 10 suitably connected with the platform levers 6, as by the link or hook-rod 11 and yoke 12, which yoke surrounds the inverted cylinder of the dash pot 15, which is rigidly held in its inverted position, as by the bracket 16 secured to the base 5. The plunger 17 of the dash pot is pivotally secured to the yoke 12.

From the equalizing bar 10 is actuated the load-offsetting mechanism, which in the modification illustrated in Figs. 1–3 consists of a pair of pendulums 18 which are fulcrumed upon knife-edge bearings carried by suitable supports 19, here shown as parallel crossbars secured within the housing 9, and are connected to opposite ends of the equalizing bar 10 by flexible steel bands 20 passing over and rigidly secured to the cams 21. The pendulums 18 are preferably positioned on opposite sides of the equalizing bar 10, as clearly indicated in Fig. 3, the cams 21 being arranged substantially in line with the equalizing bar, and the hubs 13 extending from the cams in opposite directions along the shafts 14 to receive the stems 23. The pendulum weights 22 are adjustably secured upon the stems 23, so that they can be raised or lowered upon the stems until the correct adjustment is acquired.

Thus the weighing mechanism shown in Figs. 1–3 comprises the platform levers, the equalizing bar, and connections therebetween, and the load-offsetting pendulums, which are rocked on their bearings upon vertical movement of the equalizing bar. In the embodiment of my invention shown in Fig. 4 the springs 24 are substituted for the load-offsetting pendulums 18, these springs being suitably secured at their ends to the equalizing bar and to brackets 25 carried by the housing 9 respectively.

The means for indicating the weight of the load placed upon the platform 7 comprises a graduated dial 26 preferably mounted on the front of the housing 9 and behind an inclosing glass plate carried by the housing. The index-hand 27 coöperating with the dial 26 is mounted at the forward end of the shaft 28 suitably journaled in the support 19, and on this shaft 28 is keyed a pinion 29 adapted to mesh with a vertically movable rack 30 carrying a weighted rack-foot 31. The weight of this rack-foot is preferably so shaped and arranged that its center of gravity is not in alinement with that of the rack 30 but is in a plane on the opposite side of the shaft 28 on which the pinion 29 is mounted, so that the weight will serve to always hold the teeth of the rack in close engagement with the teeth of the pinion, and preclude any lost motion therebetween. This addition of the eccentrically placed weight to the rack-foot will also aid in quickly drawing the rack 30 downward when it is released from its normal or inoperative position as hereinafter described.

A guide roller 32 is also mounted in the support 19 as shown in Figs. 1 and 3 to aid in keeping the rack 30 in proper alinement.

To positively connect the indicating mechanism with the weighing mechanism a link 33 is pivotally secured at one end to the weighted rack-foot 31 and at its other end is pivotally secured to the equalizing bar 10, as by a pin 34 mounted in ears 35 upon the equalizing bar. The effect of this link connection is to provide a lost motion connection between the equalizing bar and the indicating mechanism that will effect a permanent connection between these members while permitting substantially independent movement of the equalizing bar when a load is weighed on the scale platform and substantially independent movement of the indicating mechanism when it is released from its normal inoperative position. Also, by pivoting the link at one side of the pitch line of the rack, substantially as shown, it assists in holding the rack firmly in mesh with the pinion during the downward movement of the equalizing bar and insures the return of the rack to its initial position after the weighing is completed.

When the scale is at rest, the rack-foot 31 lies upon the equalizing bar 10 and the index-hand 27 points to zero upon the dial 26. When a load is placed upon the platform 7, the equalizing bar 10 will be lowered and the pendulums 18 rocked upon their bearings until the load is offset, the downward movement of the equalizing bar, however, not being followed by a similar movement of the rack 30 to indicate the weight of the load upon the dial, because of the mechanism now to be described, which effectively locks the rack 30 in its normal position with the index-hand 27 pointing to zero regardless of the position or movement of the equalizing bar 10 until the rack 30 is released from its locked or inoperative position by the performance of some act, such as the insertion of a coin or check.

A star-wheel 36 shaped substantially as shown in Fig. 5 is mounted upon the shaft 28 that carries the pinion 29 and the index-hand 27, and a pawl 37 normally engages a tooth of the star-wheel to lock the star-wheel and the shaft 28 against rotation, thereby preventing the rotation of the pinion 29 and index-hand 27 and holding the rack 30 in its normal or inoperative position. The pawl 37 is preferably mounted upon a pivot 38 carried by the support 19 and is provided with an arm 39 which extends laterally therefrom substantially as shown in Fig. 5. To release the pawl 37 from the star-wheel 36 to allow the indicating mechanism to show upon the dial 26 the weight of a load upon the platform 7 a lever 40 is provided, which is preferably pivoted upon the same pivot 38 that supports the pawl 37, and said lever carries at one end a weight 41 which is of a width sufficient to permit the securing thereto of a loop 42 of greater extent than the width of the arm 39 of the pawl 37. (See Figs. 1 and 5.) This loop 42 is adapted to encircle the free end of the arm 39, and normally the pressure of the star-wheel 36 upon the pawl 37 due to the weight of the rack 30 tending to rotate the pinion 29 and its shaft 28 serves to hold the arm 39 in contact with the lower portion of the loop 42. At its opposite end the lever 40 is equipped with a cup or coin-receiver 43 preferably shaped as shown in Figs. 1 and 5, and open at its outer edge for the purpose hereinafter described. This coin-receiver 43 is normally held in a slightly elevated position (see Fig. 2) by the weight 41 on the opposite end of the lever 40 and directly below the open end of the coin-tube 44, so that when a coin or check is inserted in the coin-slot 45 it will fall through the coin-tube 44 into the cup 43. The additional weight of the coin serves to overbalance the weight 41 on the opposite end of the lever and causes the lever 40 to rock upon its pivot, thereby raising the weight 41 and tripping the pawl 37 to release the star-wheel 36, whereupon the weighted rack 30 immediately descends until it contacts with the equalizing bar 10, rotating the pinion 29 and the index-hand 27 to show upon the dial the weight of the load upon the platform.

When the lever 40 has thus been rocked into substantially the position shown in dotted lines in Fig. 1, the coin will roll through the open outer edge of the coin-receiver 43 and pass through the coin-tube 46 into a suitable coin receptacle. The lever 40 relieved of the weight of the coin will again return to its normal position carrying the pawl 37 into position to again engage a tooth of the star-wheel 36 and prevent further rotation thereof, thus providing means for preventing two persons being weighed for one coin, for if a second person steps upon the platform after the index-hand has indicated the weight of the first person the equalizing bar 10 will descend to actuate the load-offsetting mechanism and the additional weight will be counterbalanced, but the pawl 37 returning into position above the star-wheel will hold the indicating mechanism in its position showing only the weight of the first person upon the platform, and the additional weight of the second person will not be indicated upon the dial unless the lever 40 is again tripped, as by the insertion of a second coin. The elongated loop 42 allows the arm 39 of the pawl to swing freely to permit the rotation of the star-wheel in the opposite direction, as when the equalizing bar 10 is raised by the return of the load-offsetting means to normal position after the load upon the platform has been removed. The equalizing bar 10 in its upward movement forces the rack 30 upwardly to its original position, rotating the pinion 29 and shaft 28 and so returning the index-hand 27 to zero on the dial 26.

In practice it has been found that certain of the teeth upon the star-wheel immediately adjacent to that tooth that holds the index-hand at zero are very seldom, if ever, used, and are unnecessary for the practical operation of the scale, for if a wieght upon the platform is so great that it forces the rotation of the index-hand to a point where these teeth would be ordinarily utilized to prevent the weighing of a second load placed on the platform after the insertion of the coin or check, the capacity of the scale would be so quickly exceeded if the second load was so placed that the provision of means to prevent this can be regarded as unwarranted.

Also by shaping the star-wheel substantially as herein shown the correct initial position of the star-wheel can be readily ascertained, thus facilitating the assembly and adjustment of the scale.

It will be seen that the above described embodiments of my invention provide means well calculated to adequately fulfil the objects primarily stated. The construction is, however, susceptible to modification without departing from the spirit and scope of the invention as set forth in the following claims.

I claim—

1. In a weighing scale, load-actuated weighing mechanism, indicating means, a rigid link pivotally connecting the indicating means and the load-actuated mechanism, whereby substantially independent movement of the load-actuated mechanism is permitted, means whereby said indicating means is normally held in inoperative position, and means for releasing said indicating means from its inoperative position.

2. In a weighing scale, load-actuated weighing mechanism, indicating means, including a movable rack, a rigid link pivotally connecting said rack with the load-actuated mechanism, whereby substantially independent movement of the load-actuated mechanism is permitted, means whereby said indicating means is normally held in inoperative position, and means for releasing said indicating means from its inoperative position.

3. In a weighing scale, load-actuated weighing mechanism, indicating means, including a movable rack having a weight thereon, a rigid link pivotally connecting said weight with the load-actuated mechanism, whereby substantially independent movement of the load-actuated mechanism is permitted, means whereby said indicating means is normally held in inoperative position, and means for releasing said indicating means from its inoperative position.

4. In a weighing scale, load-actuated weighing mechanism including an equalizing bar, indicating means, a rigid link pivotally connecting the indicating means with said equalizing bar, whereby substantially independent movement of the load-actuated mechanism is permitted, means whereby said indicating means is normally held in inoperative position, and means for releasing said indicating means from its inoperative position.

5. In a weighing scale, load-actuated weighing mechanism, indicating means including a pinion, a rack engaged therewith, a weight carried by said rack having its center of gravity out of alinement with that of said rack to hold the rack in close engagement with the pinion, a link connection between said weight and the load-actuated mechanism, means whereby said indicating means is normally held in inoperative position, and means for releasing said indicating means from its inoperative position.

6. In a weighing scale, load-actuated weighing mechanism including an equalizing bar, indicating means including a weighted rack normally in contact with said equalizing bar, a rigid link pivoted to said rack and bar and forming a connection between the equalizing bar and indicating means whereby movement of the equalizing bar away from said weighted rack is permitted under load, means whereby said indicating means is normally held in inoperative position, and means to release said indicating means from its inoperative position to allow said weighted rack to again contact with the equalizing bar.

7. In a weighing scale, load-actuated weighing mechanism including an equalizing bar, indicating means including a pinion, a rack engaged therewith, a weight carried by said rack and normally in contact with said equalizing bar, said weight having its center of gravity out of alinement with that of said rack to hold the rack in close engagement with the pinion, a rigid link pivoted to said weight and bar and forming a connection between said weight and the load-actuated mechanism whereby movement of the equalizing bar away from said weighted rack is permitted under load, means whereby said indicating means is normally held in inoperative position, and means to release said indicating means from its inoperative position to allow said weight to again contact with the equalizing bar.

8. In a weighing scale, load-actuated weighing mechanism including an equalizing bar, indicating means including a pinion, a rack engaged therewith, a weight carried by said rack and normally in contact with said equalizing bar, said weight having its center of gravity out of alinement with that of said rack to hold the rack in close engagement with the pinion, a rigid link pivoted to said weight and bar and forming a connection between said weight and the load-actuated mechanism whereby movement of the equalizing bar away from said weighted rack is permitted under load, means whereby said indicating means is normally held in inoperative position, and means to release said indicating means from its inoperative position to allow said weight to again contact with the equalizing bar, said holding and releasing means including a star-wheel mounted on the same shaft as said pinion, a pawl normally engaged therewith, and a weighted lever adapted to move said pawl out of engagement with said star-wheel.

9. In a weighing scale, load-actuated weighing mechanism including a cross-bar, indicating means normally held in inoperative position including a weighted movable rack and a link comprising spaced rigid side bars pivoted to said rack and cross-bar respectively, whereby substantially independent movement of the cross-bar with the load-actuated mechanism is permitted, and means for releasing said indicating means from its inoperative position.

FRANK P. DUNN.

Witnesses:
G. E. WALES,
GUY N. COLLIER.